(12) United States Patent
Kaleko et al.

(10) Patent No.: US 12,046,041 B2
(45) Date of Patent: Jul. 23, 2024

(54) FLIGHT GUIDANCE AND CONTROL INTERFACES FOR UNMANNED AIR VEHICLES

(71) Applicant: MOTOROLA SOLUTIONS, INC., Chicago, IL (US)

(72) Inventors: David Kaleko, Oak Park, IL (US); Juan Felipe Gonzalez-Gomez, Sterrett, AL (US); Luke Young, Temecula, CA (US); Alexander Saputa, Hoover, AL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 539 days.

(21) Appl. No.: 17/330,136

(22) Filed: May 25, 2021

(65) Prior Publication Data

US 2022/0383029 A1    Dec. 1, 2022

(51) Int. Cl.
 *G06V 20/52* (2022.01)
 *B64C 39/02* (2023.01)
 *B64D 47/08* (2006.01)
 *B64U 101/30* (2023.01)
 *G05D 1/00* (2024.01)
 *G06V 20/40* (2022.01)
 *G06V 40/10* (2022.01)

(52) U.S. Cl.
 CPC ............ *G06V 20/52* (2022.01); *B64C 39/024* (2013.01); *B64D 47/08* (2013.01); *G05D 1/0094* (2013.01); *G06V 40/103* (2022.01); *B64U 2101/30* (2023.01); *G06V 20/44* (2022.01)

(58) Field of Classification Search
 CPC ............ B64U 2201/00; B64U 2101/30; G06V 20/44; G06V 20/17; G06V 20/52; G06V 20/647; G06V 40/103; B64C 39/024; B64D 47/08; G05D 1/0094

USPC ........................................................ 382/103
See application file for complete search history.

(56) References Cited

U.S. PATENT DOCUMENTS 10,301,018 B2    5/2019  Mucci
10,388,132 B2    8/2019  Cutcher et al.
(Continued)

FOREIGN PATENT DOCUMENTS

AU    2016331221 B2    4/2017
WO    2017137393 A1    8/2017
WO    2020052103 A1    3/2020

OTHER PUBLICATIONS

Mary-Ann Russon, Drones to the Rescue!, BBC News, May 1, 2018, available at https://www.bbc.com/news/business-43906846.

*Primary Examiner* — Kenny A Cese
(74) *Attorney, Agent, or Firm* — Daniel R Bestor

(57) ABSTRACT

Systems, methods, and devices described in the present disclosure provide technology for detecting features of interest depicted in a video stream supplied by a camera-equipped drone and adjusting the flight pattern of the drone to increase the amount of time in which the features of interest are within the line of sight of the drone. In addition, the present disclosure provides technology for detecting when events of interest occur at the features of interest and alerting personnel when the events occur. In some examples, the technology of the present disclosure also determines a format for an alert (e.g., a push notification) based on an event type so that personnel who receive the alert are apprised of the urgency of the event based on the format.

20 Claims, 7 Drawing Sheets

(56) References Cited

U.S. PATENT DOCUMENTS

| | | | | |
|---|---|---|---|---|
| 11,094,185 B2* | 8/2021 | Farrand | ................ | G08B 25/008 |
| 2016/0247407 A1* | 8/2016 | Paczan | ................ | B64C 39/024 |
| 2018/0327091 A1* | 11/2018 | Burks | ................ | B64C 39/024 |
| 2019/0051007 A1* | 2/2019 | Pohl | ................ | G06T 7/74 |
| 2019/0378423 A1* | 12/2019 | Bachrach | ................ | H04L 67/52 |
| 2020/0118451 A1* | 4/2020 | Dawson-Townsend | ................ | G08G 5/0008 |
| 2022/0169381 A1* | 6/2022 | Alrasheed | ................ | G06T 7/74 |

* cited by examiner

FLIGHT GUIDANCE AND CONTROL INTERFACES FOR UNMANNED AIR VEHICLES

BACKGROUND

Unmanned air vehicles (UAVs) can be used for many recreational, industrial, and military purposes. Drones and other types of UAVs may be equipped with cameras and may be controlled wirelessly via a remote control. A user may steer a drone to a desired position so that a camera coupled to the drone provides a desired aerial view of an area.

Quadcopters (i.e., quadrotors) are a type of drone that has become popular in the past decade as wireless communication technologies have advanced and high-resolution digital cameras have become smaller. In general, a quadcopter has four rotors. When a quadcopter is in flight, two of the rotors may spin clockwise and two of the rotors may spin counterclockwise. If all four rotors spin at the same angular velocity, the net torque about the yaw axis is zero. This allows quadcopters to fly without the tail rotor used in conventional helicopters. Quadcopters may also have a simpler flight control system that does not have to include the cyclic pitch control functionality found in conventional helicopters. Drones with other numbers of rotors (e.g., six or eight) also exist.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
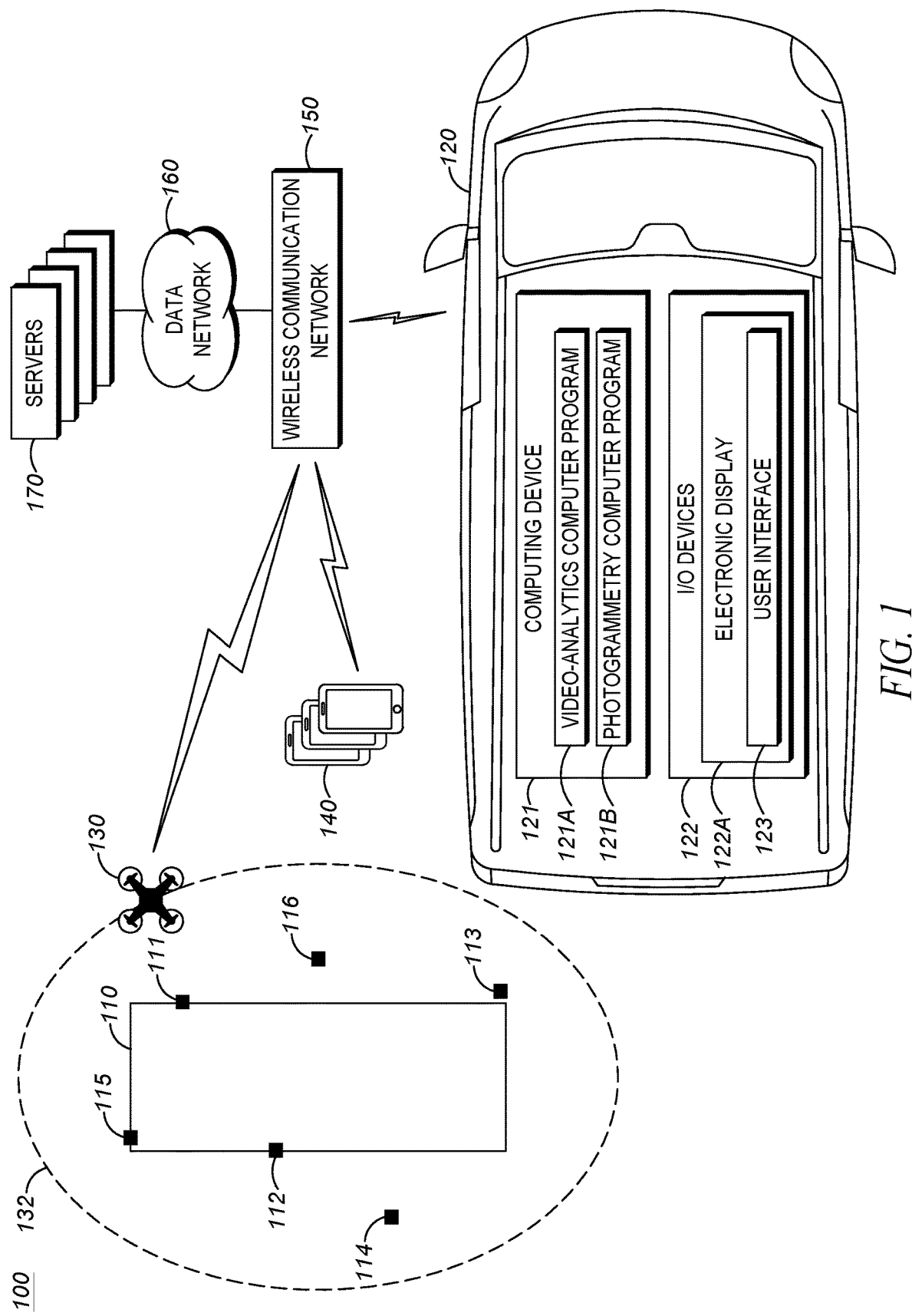
FIG. 1 illustrates an example environment in which systems of the present disclosure may operate, according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Emergency-response personnel often have to respond to incidents in which time is of the essence and lives are at stake. Firefighters, for example, may have little time to identify where people trapped in a burning building might be found, which entrances of the building can be used safely, which parts of the building may be in danger of collapsing, which direction the fire is moving throughout the building, and where potentially explosive materials may be stored in the building. In another example, police officers responding to a report of a crime taking place in a building may wish to monitor entry points (e.g., windows and doors) to detect when a suspect attempts to escape, point firearms at officers, dispose of potential evidence, or assault hostages. In scenarios such as these, drones can provide aerial views of buildings or other types of structures where emergencies are taking place. The aerial views provided by the drones can help emergency responders make more informed decisions during these types of scenarios—decisions on which the lives of victims, responders, and even criminal suspects may depend.

However, amidst the confusion and chaos that often accompany emergencies, the incident commanders (ICs) who supervise and direct the efforts of emergency responders may be inundated with a deluge of information amidst a dissonant chorus of agitated voices from victims, witnesses, responders, and dispatchers (e.g., via radio communication devices). The scene of an emergency may also be full of potential dangers that have to be monitored closely. Drones may provide video feeds through which a dispatcher, the incident commander, or another emergency responder may survey the scene of an emergency through several different viewing perspectives.

However, the incident commander will likely be obliged to prioritize which sources of information—audio, visual, and otherwise—will receive the incident commander's attention at any given moment. As an emergency situation unfolds, some events may rapidly elevate the urgency with which a particular information source should receive the incident commander's attention. For example, if a person suddenly appears at a second-story window of a burning building, a drone's video stream in which that window is visible may suddenly merit the incident commander's immediate attention. However, if the incident commander's attention is focused elsewhere when the person appears at the window, valuable time may elapse before the incident commander notices the person shown in the drone's video stream. Such a delay may reduce the person's chance of surviving the incident. In another example, suppose an entrance through which firefighters entered the burning building suddenly becomes blocked by burning debris. Even if the entrance can be seen on the drone's video feed, an incident commander whose attention is focused on a different information source at the moment when the entrance becomes blocked might not notice the blockage immediately. The delay between when the blockage occurs and when the incident commander notices the blockage may reduce the odds that the incident commander will apprise the firefighters of the danger quickly enough for the firefighters to find an alternative exit from the building.

In an incident such as a fire in a building, events occurring at features such as doors, windows, fire escapes, gas meters, and weight-bearing wooden beams may merit an incident commander's immediate attention. If the fire is moving dangerously close to a gas meter, for example, it may be prudent to direct the incident commander's attention to the gas meter immediately. Similarly, if a weight-bearing wooden beam suddenly begins to buckle, it may be prudent to direct the incident commander's attention to the wooden beam. However, in other types of incidents, events occurring at features such as gas meters and wooden beams may be much less likely to merit the incident commander's attention. For example, if police officers are responding to a report of a stolen vehicle seen in the underground parking garage of an apartment complex, events occurring at a gas meter may be unlikely to merit the attention of the incident commander. Events at a feature such as a vehicle access gate situated along a wall that surrounds the apartment complex, on the other hand, may be very likely to merit the incident commander's attention (e.g., when a vehicle attempts to enter or exit through the gate).

Regardless of what type of incident is occurring, it may be prudent for a drone to devote more time to capturing features that are of interest for that particular incident type in the video stream that the drone provides and less time to capturing features that are not of interest. Furthermore, it may be prudent to alert an incident commander when certain types of events occur at features of interest so that the incident commander's attention can be redirected without delay.

Thus, there exists a need for an improved technical method, device, and system for controlling flight patterns of camera-equipped drones during public-safety incidents so that the video stream provided by those drones will focus on features that are pertinent to the types of those incidents. Furthermore, there exists a need for mechanisms that can detect events of interest that occur at features of interest and alert incident commanders or other personnel when such events merit immediate attention.

Systems, methods, and devices described in the present disclosure provide technology for detecting features of interest depicted in a video stream supplied by a camera-equipped drone and adjusting the flight pattern of the drone to increase the amount of time in which the features of interest are within the line of sight of the drone. In addition, the present disclosure provides technology for detecting when events of interest occur at the features of interest and alerting personnel when the events occur. In some examples, the technology of the present disclosure also determines a format for an alert (e.g., a push notification) based on an event type so that personnel who receive the alert are apprised of the urgency of the event based on the format.

Further advantages and features consistent with this disclosure will be set forth in the following detailed description with reference to the figures.

Referring now to the drawings, FIG. 1 illustrates an example environment 100 in which systems of the present disclosure may operate, according to one example. The environment 100 includes a structure 110 (e.g., a house, an office building, a parking garage, a stadium, a theater, a factory, a silo, grain bin, a barn, a warehouse, a lighthouse, a wind turbine, a windmill, a smokestack, a water tower, a house boat, a recreational vehicle (RV) or some other type of structure) and features 111-116 which are associated with the structure. As used herein, the term "features" may refer to any physical element that can be detected in an image via one or more computer-vision techniques for object detection. Some features (e.g., windows and doors) may form an integral part of the structure. In addition, some features (e.g., ladders, power lines, propane tanks, satellite dishes, tool sheds, bushes, swimming pools, and fences) may be affixed to the structure or may lie within the curtilage of the structure. Furthermore, some features (e.g., automobiles, fire hydrants, sewer lids, and telephone poles) may be associated with the structure by being proximal to the structure (e.g., positioned within a predefined radius of the structure, such as one hundred feet).

The environment 100 further includes public-safety response vehicle 120 (e.g., a command van, a police car, an ambulance, or a fire engine). As shown, the public-safety response vehicle 120 may include a computing device 121 that is communicatively coupled to input/output (I/O) devices 122, including the electronic display 122a (e.g., a flat-screen monitor) The I/O devices 122 may include other elements (e.g., a keyboard, a mouse, and a microphone) which are not explicitly shown. Mobile devices 140 may be carried by public-safety responders (e.g., police officers, firefighters, or paramedics). The environment 100 further includes an unmanned aerial vehicle (UAV) 130 (e.g., a drone, such as a quadcopter) that is equipped with a digital camera (not shown)

The environment 100 further includes a wireless communication network 150 that provides wireless services to communication devices within a coverage area of the wireless communication network 150, such as the UAV 130, the mobile devices 140, and the computing device 121. The environment 100 may further include servers 170 that are in communication with the wireless communication network 150 via a data network 160 (e.g., the Internet, an enterprise network, or a public-safety agency network). The servers 170 may be in communication with the UAV 130, the mobile devices 140, and the computing device 121 via the wireless communication network 150 and the data network 160.

In some examples, the public-safety response vehicle 120 may include a digital vehicular repeater system (DVRS) capable of relaying communications between the wireless communication network 150, the UAV 130, and the mobile devices 140 and may include ultrasonic or ultra-wideband transmitter/receiver circuitry capable of engaging in wireless communications with ultrasonic or ultra-wideband transmitter/receiver circuitry of the UAV 130. The wireless communication network 150, the data network 160, the servers 170, and any components thereof may be referred to as infrastructure elements.

The wireless communication network 150 may include a radio access network (RAN) comprising one or more wireless access nodes (not shown), such as an access point (AP), a base station, or an evolved Node B (eNodeB); the RAN may be in communication with a core network (not shown). The wireless communication network 150 may operate in accordance with any wireless communication technology that supports data applications. For example, the wireless communication network 150 may be a public safety (PS) network that can utilize, for example, Third Generation Partnership Project Long-Term Evolution (3GPP LTE), Fifth Generation Wireless (5G), Enhanced Voice-Data Optimized (EVDO), Institute of Electrical and Electronics Engineers (IEEE) 802.11 and variants thereof (e.g., Wi-Fi), Project 25 (P25), Digital Mobile Radio (DMR), Land Mobile Radio (DMR), Terrestrial Trunked Radio (TETRA), etc.

When a public-safety incident occurs at the structure 110, the public-safety response vehicle 120, the UAV 130, and the public-safety responders associated with the mobile devices 140 may be dispatched to a location of the structure 110 in response to a report of the incident (e.g., received via an emergency call). The UAV 130 may be configured to aim the digital camera at the structure 110 and transmit a video stream to the computing device 121 through a wireless signal sent via the wireless communication network 150 (or via Bluetooth®) while the UAV 130 flies along a flight trajectory 132 that circumnavigates the structure 110. The computing device 121 applies a video-analytics computer program 121*a* (e.g., a tool such as Voxel51®, the Rocket video analytics platform available through GitHub®, YOLO®, or some other video analytics program) to the video stream to identify the features 111-116 of the structure 110. In some examples, the process of applying the video-analytics computer program 121*a* at the computing device 121 may involve transferring data from the video stream to the servers 170 via the wireless communication network 150 and the data network 160. The computing device 121 may also make one or more function calls via Application Programming Interfaces (APIs) that are used by the video-analytics computer program 121*a* and are sent to the servers 170. The servers 170 may perform computations dictated by the video-analytics computer program 121*a* and transfer results of those computations back to the computing device 121. Persons of ordinary skill in the art will understand that some computations triggered by the video-analytics computer program 121*a* may be performed using any combination of processors and memory that are found in one or more of the computing device 121, the servers 170, and the UAV 130 without departing from the spirit and scope of this disclosure.

The video-analytics computer program 121*a*, when applied to the video stream, identifies features associated with the structure, such as the features 111-116. Once the features 111-116 have been identified, the computing device 121 identifies a list of feature types associated with a type of the incident. The computing device 121 compares the features 111-116 to the list of feature types and determines if any of the features 111-116 are instances of feature types included in the list. Each of the features 111-116 that is an instance of a feature type included in the list is designated as a feature of interest. For the purposes of this example, suppose that feature 111 is a feature of interest and features 112-116 are not features of interest.

Note that, in some scenarios, there may be more than one incident type. A building fire, for example, may also occur at the same time and place as another type of incident (e.g., a robbery in which a robber commits arson, a riot in which an angry mob sets fire to the building, etc.). In such scenarios, the computing device 121 may form an aggregate list of feature types by combining the respective lists of feature types for each applicable incident type and use the aggregate list to determine which of the features 111-116 are of interest for any of the applicable incident types.

Also, in some examples, the user interface 123 that is displayed to an incident commander via the I/O devices 122 may allow the incident commander to designate some features as features of interest manually even if those features are not instances of feature types included in the list. The user interface 123 may also allow the incident commander to designate some features as not being features of interest manually even if those features are instances of feature types included in the list.

Once the feature 111 has been designated as a feature of interest, the computing device 121 sends a wireless signal to the UAV 130 (e.g., via the wireless communication network 150) instructing the UAV 130 to reduce the speed at which the UAV 130 moves along the flight trajectory 132 when the features 111 is within a line of sight of the UAV 130. In this context, a feature of interest is within a line of sight of the UAV 130 when there is a straight path from the UAV 130 to the feature of interest that is not obstructed by any physical object. The computing device 121 may further instruct the UAV 130 (e.g., via the wireless communication network 150) to increase the speed at which the UAV 130 moves along the flight trajectory 132 when no features of interest (e.g., feature 111) is within a line of sight of the UAV 130. The computing device 121 may also instruct the UAV 130 to adjust the orientation of the digital camera whenever a feature of interest (e.g., feature 111) is within the line of sight of the drone to maintain the feature of interest within the field of view (FOV) of the digital camera. If the digital camera is mounted to the UAV 130 via a gimbal, for example, the UAV 130 may rotate the gimbal to adjust the orientation of the digital camera. The UAV 130 may also adjust the orientation of the entire UAV 130 about the pitch, roll, or yaw axes in order to change the orientation of the digital camera.

In some examples, the speed at which the UAV 130 moves when a feature of interest (e.g., feature 111) is within a line of sight of the UAV 130, the speed at which the UAV 130 moves when no feature of interest is within a line of sight of the UAV 130, or a ratio of these two speeds may be configurable via the user interface 123 that is displayed to an incident commander via the I/O devices 122. For example, the incident commander may specify a first speed at which the UAV 130 is to move when a feature of interest is within a line of sight of the UAV 130 and a second speed at which the UAV 130 is to move when no feature of interest is within a line of sight of the UAV 130. Also, in some examples, the incident commander may specify a ratio of the first speed to the second speed (e.g., a ratio of ½ if the incident commander wishes for the UAV 130 to move twice as fast along the flight trajectory 132 when no feature of interest is visible). Any other ratio (e.g., ⅓, ¾, or some other ratio of the first speed to the second speed) may be used without departing from the spirit and scope of this disclosure. Once the incident commander has provided the first speed (or the second speed) and the ratio, the computing device 121 can readily calculate the second speed (or the first speed) using the ratio. Furthermore, in some examples, the incident commander may assign different speeds at which the UAV 130 is to move along the flight trajectory 132 when different types of features of interest are within a line of sight of the UAV 130, respectively.

The computing device 121 may be configured to detect (e.g., via the video-analytics computer program 121*a*) when an event commences at a feature of interest (e.g., feature 111). In this example, suppose that an event commences at the feature 111. The computing device 121 identifies an event type for the event (e.g., via the video-analytics computer program 121*a*) and determines a priority level for the event based on the event type and the feature type of the feature 111. For example, a hash table or another data structure associated with the feature type of the feature 111 may map the event type to a priority level. If the priority level satisfies a predefined condition (e.g., meets a predefined threshold), the computing device 121 may determine that a push notification should be used to alert the incident commander or the public-safety responders who are carrying the mobile devices 140.

The computing device 121 may determine a format for the push notification based on the priority level. For example, if the priority level indicates a high level of urgency, the format may call for devices that receive the push notification to emit loud sounds (e.g., simulating alarm bells), vibrate (e.g., via haptic mechanisms), and display images of the event on a display (e.g., screens on the mobile devices 140 or the electronic display 122a). For example, the push notification may include a still image extracted from the video stream that depicts the feature 111 after commencement of the event. Similarly, the push notification may include a video clip extracted from the video stream that depicts the feature 111 after commencement of the event. The push notification may also comprise a text message sent via a Simple Messaging Service (SMS), a Multimedia Messaging Service (MMS), or some other type of messaging service. The push notification may also indicate the event type or the feature type.

Furthermore, if the computing device 121 determines that the priority level satisfies a condition (e.g., meets a threshold) and the incident commander is currently viewing video streams provided by other UAVs (not shown) in addition to the video stream provided by the UAV 130 in multiple respective viewing areas in the user interface 123 on the electronic display 122a, the computing device 121 may increase the size of a viewing area for the video stream from the UAV 130 and decrease the size of viewing areas for video streams from the other UAVs to further ensure that the incident commander's attention is redirected to the viewing area for the video stream from the UAV 130.

In addition, in some examples, the priority level of the event type may satisfy a condition that suggests an altitude of the flight trajectory 132 should be adjusted so that the video stream provided by the digital camera coupled to the UAV 130 can provide a more direct view of the feature 111. Thus, if the computing device 121 detects that the priority level of the event satisfies the condition, the computing device 121 may send a wireless signal to the UAV 130 instructing the UAV 130 to adjust an altitude of the flight trajectory 132 so that the flight trajectory 132 will intersect with a line that (1) passes through the feature 111 and (2) is normal to a plane that is parallel to a face of the structure 110 on which the feature 111 is located. If the feature 111 is a door or a window, this may allow the incident commander to peer deeper into the structure via the video feed after the adjustment is made when the UAV 130 passes through the line while moving along the flight trajectory 132.

In some examples, once the UAV 130 has circumnavigated the structure 110 at least once such that views from each side of the structure 110 have been captured in the video stream provided by the UAV 130, the computing device 121 may further apply a photogrammetry computer program 121b (e.g., COLMAP™, which is available through GitHub®; Meshroom™; MicMac™; or some other photogrammetry program) to the video stream or a plurality of still images extracted therefrom to generate a digital three-dimensional (3D) model of the structure 110. The process of applying the photogrammetry computer program 121b at the computing device 121 may involve transferring data from the video stream to the servers 170 via the wireless communication network 150 or the data network 160. The computing device 121 may also make one or more function calls via Application Programming Interfaces (APIs) that are used by the photogrammetry computer program 121b and are sent to the servers 170. The servers 170 may perform computations dictated by the photogrammetry computer program 121b and transfer results of those computations back to the computing device 121. Persons of ordinary skill in the art will understand that some computations triggered by the photogrammetry computer program 121b may be performed using any combination of processors and memory that are found in one or more of the computing device 121, the servers 170, and the UAV 130 without departing from the spirit and scope of this disclosure.

Once the digital 3D model of the structure 110 has been generated, the computing device 121 may cause the electronic display 122a to render an image of the 3D model such that a region of the 3D model that depicts the feature 111 is highlighted in the image. For example, the region of the 3D model that depicts the feature 111 may be highlighted by a blinking arrow that that overlays the image and points to the feature 111. The region of the 3D model that depicts the feature 111 may also be enhanced with a highlight color (e.g., red, neon orange, or some other color that is likely to draw a viewer's attention).

The user interface 123 may allow an incident commander to zoom in/out and rotate the 3D model and cause an updated image to be rendered from any viewing perspective that the incident commander wishes. This allows the incident commander to observe details of the structure 110 that are not currently visible in the video stream provided by the UAV 130 (e.g., details that are currently not within a line of sight of the UAV 130). If any changes to such details are observed during a subsequent lap of the UAV 130 around the structure 110 along the flight trajectory 132, the 3D model can be updated to reflect those changes and an updated image can be rendered accordingly.

If an event of interest commences at the feature 111 and a priority level for the event satisfies a condition (e.g., meets a threshold), the computing device 121 may cause the electronic display 122a to render an updated image of the 3D model. The updated image of the 3D model may illustrate the 3D model in a manner such that a face of the 3D model on which the feature 111 is found is aligned in parallel with the plane of the electronic display 122a (e.g., a plane in which a flat screen of the electronic display lies). This may provide the incident commander with a better view of the feature 111 as the event of interest unfolds.

The computing device 121 may further cause the electronic display 122a to render a graphical indication of the event type in the region of the 3D model that depicts the feature 111. The graphical indication may be, for example, a blinking icon that partially overlays the region that depicts the feature 111. For example, suppose the feature 111 is a window. If smoke begins to flow from the window, the blinking icon may have the appearance of a gray cloud. If fire becomes visible in the window, the blinking icon may have the appearance of a flame. If a person becomes visible in the window, the blinking icon may have the appearance of a stick figure.

Figure 2A:
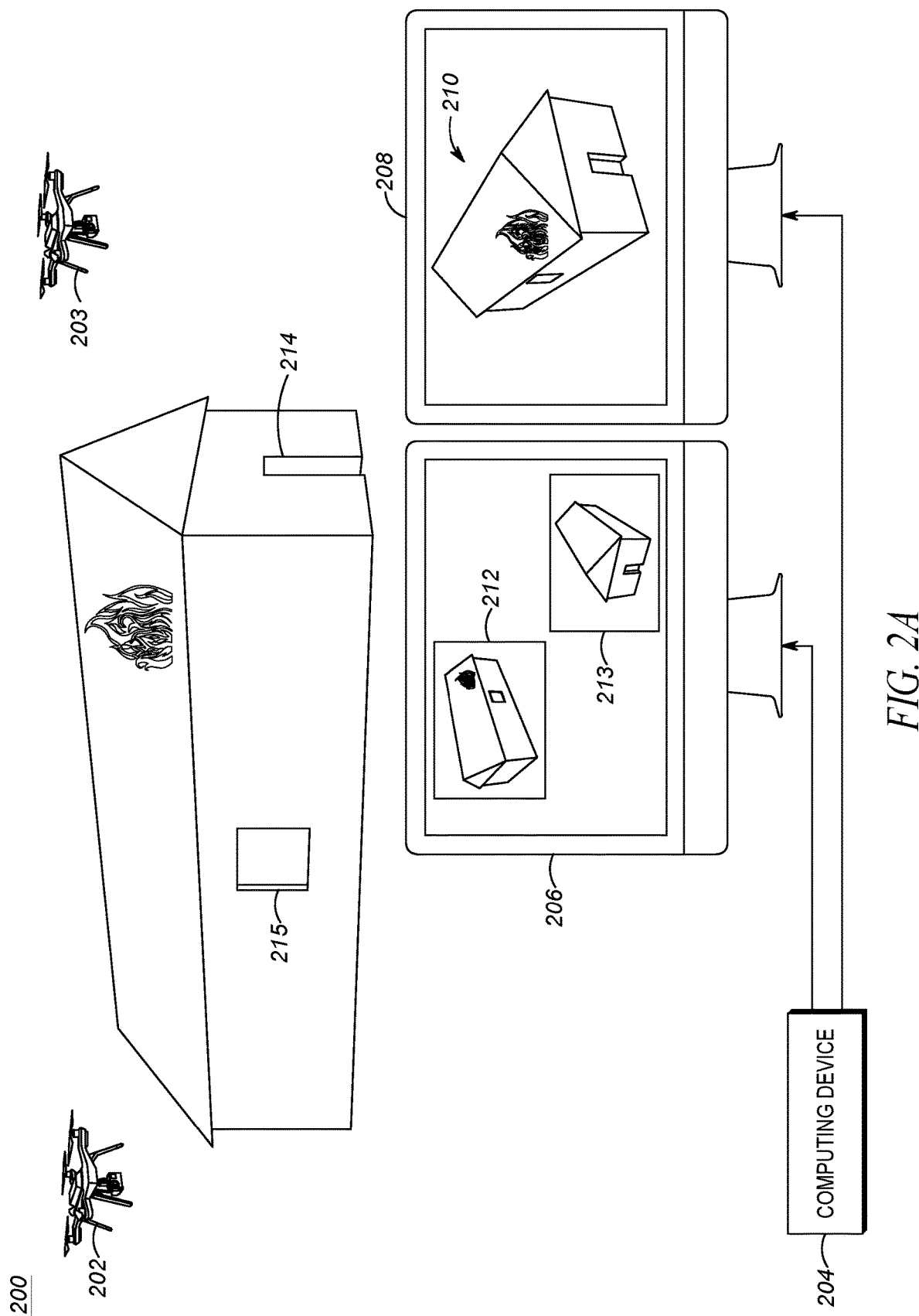
FIGS. 2a-2b illustrate how systems described in this disclosure may operate during a fire incident, according to one example.
Figure 2B:
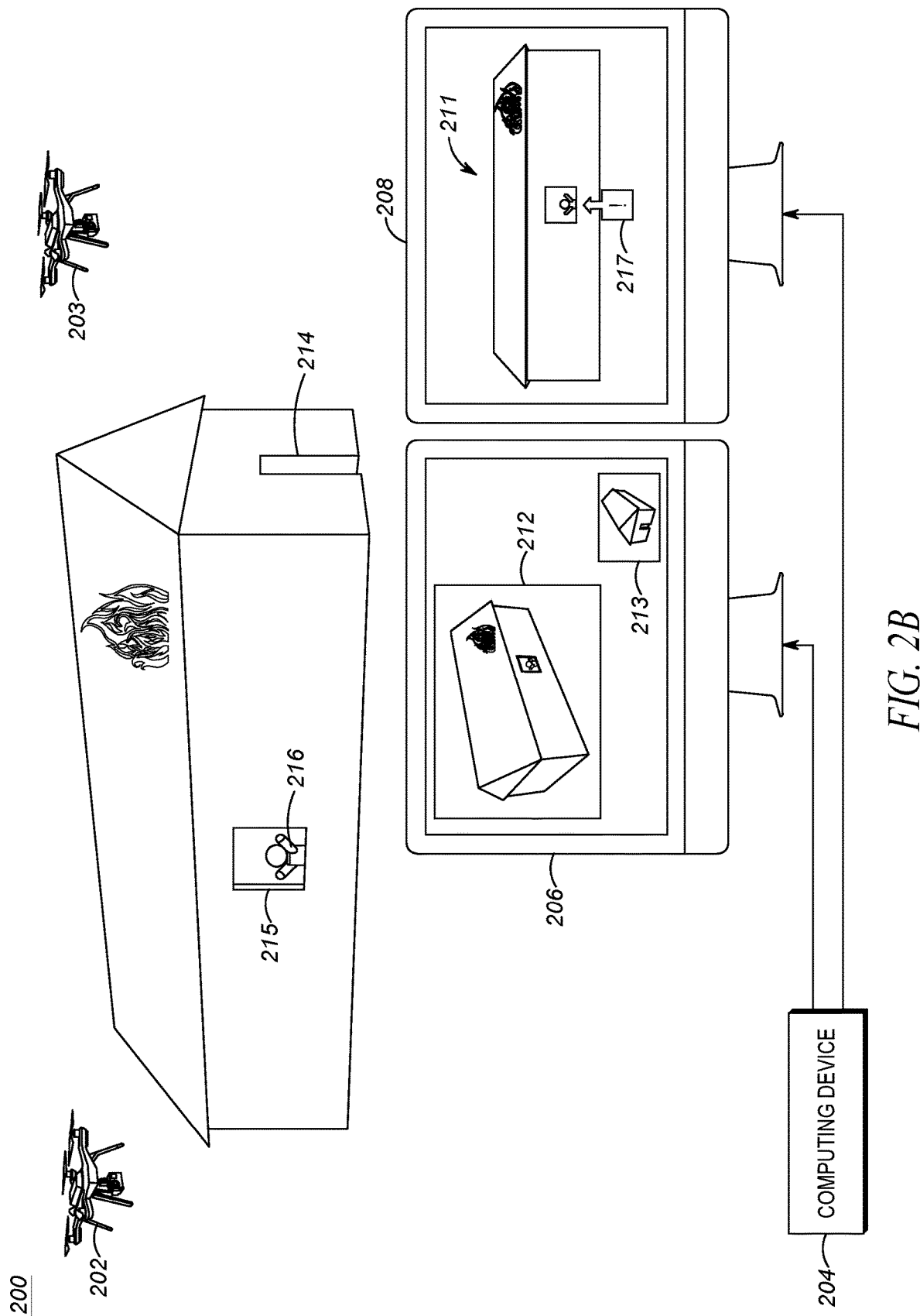

FIGS. 2a-2b illustrate how systems described in this disclosure may operate during a fire incident, according to one example. With respect to FIG. 2a, suppose a fire department receives an emergency call that reports a fire occurring at the house 200. Further suppose that firefighters are dispatched to the scene and that the drone 202 and the drone 203 are deployed. The drone 202 and the drone 203 fly laps around the house 200 and provide video streams from digital cameras that are attached to the drone 202 and the drone 203, respectively. A computing device 204 receives the video streams via wireless signals from the drone 202 and the drone 203. The computing device 204 is communicatively connected to the electronic display 206 and the electronic display 208, which are viewed by an incident commander. The electronic display 206 displays the video streams from the drone 202 and the drone 203 in the viewing area 212 and 213, respectively. The electronic display 208 displays an image 210 of a 3D model of the house 200.

The computing device 204 applies a video-analytics computer program to the video streams from the drones 202, 203 and determines that the door 214 and the window 215 are instances of feature types (door and window) that are included in a list of feature types associated with the incident type "fire." Therefore, the computing device 204 signals the drone 202 to fly at a reduced speed when the door 214 or the window 215 is within a line of sight of the drone 202. The computing device 204 similarly signals the drone 203 to fly at a reduced speed when the door 214 or the window 215 is within a line of sight of the drone 203. The computing device 204 may further instruct the drone 202 to maintain the door 214 (or the window 215) within a field of view of the digital camera attached to the drone 202 when the door 214 (or the window 215) is within a line of sight of the drone 202. The computing device 204 may instruct the drone 203 similarly.

With respect to FIG. 2b, suppose that a person 216 suddenly becomes visible through the window 215. The computing device 204, which continues to apply the video-analytics computer program to the video streams provided by the drones 202, 203, detects the appearance of the person 216 at the window 215 as an event that has commenced. The computing device 204 determines the event type ("person detected") and determines a priority level for the event based on the event type ("person detected") and the feature type ("window"). Upon determining that the priority level for the event satisfies a condition (e.g., the priority level is a number that meets a threshold), the computing device 204 determines a format for a push notification based on the priority level and sends the push notification to a mobile devices (not shown) that are associated with (e.g., carried by) firefighters at the scene and the incident commander.

Furthermore, since the video stream from the drone 202 (shown in the viewing area 212) currently shows the window 215 and the video stream from the drone 203 does not, the computing device 204 causes the electronic display 206 to increase the size of the viewing area 212 and decrease the size of the viewing area 213 so that the incident commander will have larger view of the window 215. In addition, the computing device 204 causes the electronic display 208 to render an updated image 211 of the 3D model. As shown, in the updated image 211, the face of the house 200 on which the window 215 is located is aligned with the plane of the electronic display 208. Furthermore, the computing device 204 causes the electronic display 208 to render the icon 217 adjacent to the window 215 in the updated image 211.

Due to the push notifications and the other measures taken to direct the attention of the incident commander of the presence of the person 216 at the window 215, the incident commander is immediately apprised of the situation and instructs firefighters (not shown) to go to the window 215 to help the person 216 escape from the house 200.

Figure 3:
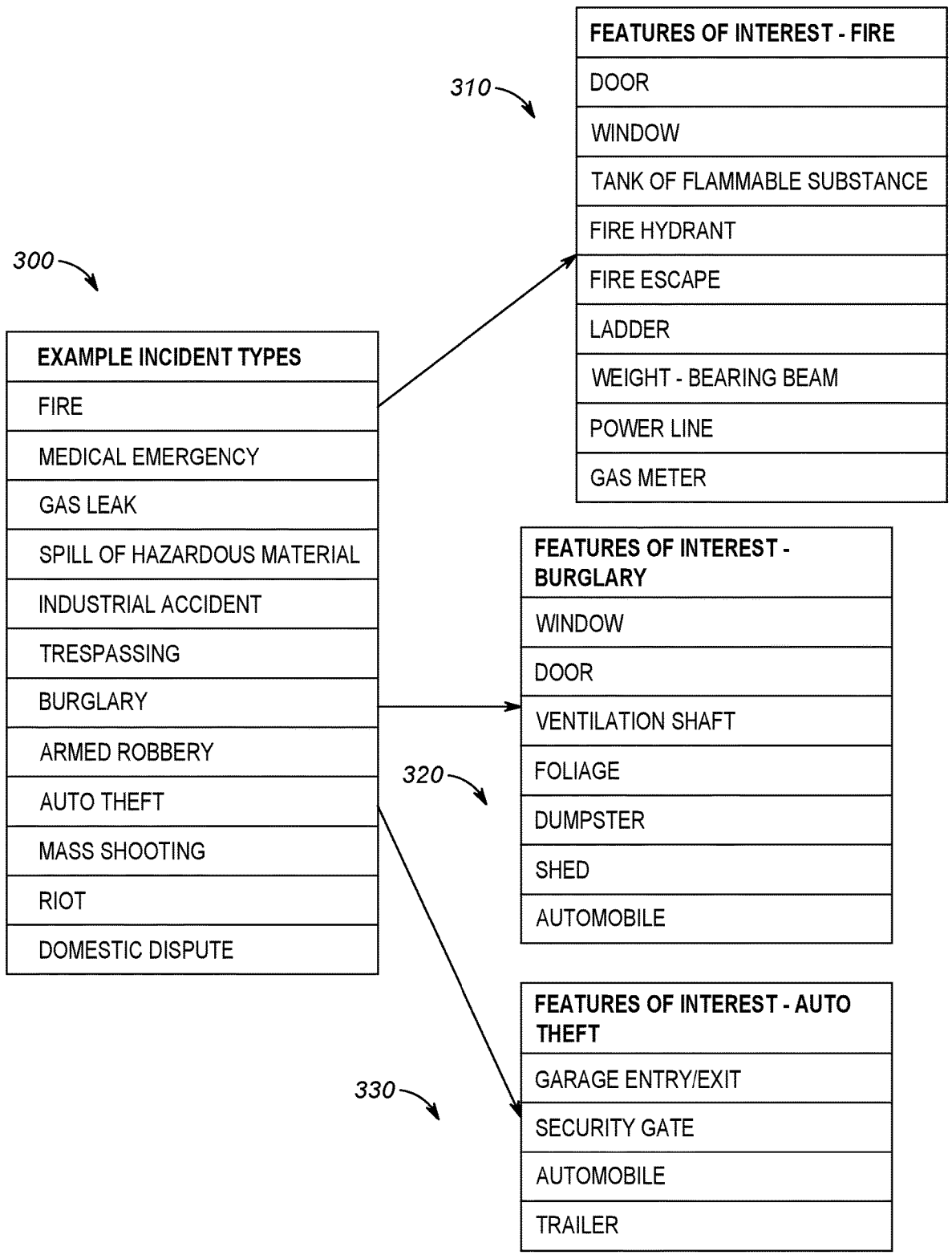
FIG. 3 provides an example list of incident types and example lists of feature types, according to one example.

FIG. 3 provides an example list 300 of incident types and example lists 310, 320, 330 of feature types, according to one example. The incident types and feature types shown are merely illustrative; persons of ordinary skill in the art will recognize that other incident types and feature types not shown in FIG. 3 may be used without departing from the spirit and scope of this disclosure.

As shown in the list 300, some examples of incident types may include fires, medical emergencies, gas leaks (e.g., of methane), spills of hazardous materials, industrial accidents, trespassing incidents, burglaries, armed robberies (e.g., a bank robbery), auto thefts, mass shootings, riots, and domestic disputes. However, the systems and methods disclosed herein may be applied for many other types of incidents to which emergency-response personnel may be deployed.

The list 310 provides examples of types of features that may be of interest during a fire incident. Doors and windows, for example, are features through which egress into or out of a structure and may therefore be of interest during a fire. People may try to escape the fire via such windows or doors, while firefighters may enter the structure through windows or doors to look for people in need of rescue or to spray water at the fire from a location within the structure. Tanks of flammable substances (e.g., propane, gasoline, or butane) and gas meters are also of interest during a fire because they may fuel the fire or explode, thereby endangering firefighters and other people located at the scene of the fire. Fire hydrants may be of interest because they can provide water for fire hoses that are used to extinguish the fire. Fire escapes and ladders may be of interest because people are likely to attempt to use them to escape from the fire. Weight-bearing beams may be of interest because their structural integrity may be compromised by the fire, thus causing ceilings or other structural elements to collapse and trap or injure firefighters. Power lines may also be of interest because the fire may damage insulation or electrical connections, thereby exposing live wires that may pose an electrocution hazard for firefighters or a potential ignition source (e.g., due to sparks).

The list 320 provides examples of types of features that may be of interest during a burglary incident. Windows and doors may be of interest because they may be used by a burglar may to enter or exit a structure. Similarly, ventilation shafts may be of interest because a burglar may use them to enter or exit the structure—or simply as a place to hide. Other potential hiding places, such as foliage, dumpsters, and sheds, may also be of interest. Automobiles may be of interest because they may be used as hiding places or as getaway vehicles.

The list 330 provides examples of feature types that may be of interest during an auto theft incident. A garage entry/exit may be of interest because a suspect may attempt to flee through it with a stolen vehicle. A security gate (e.g., in a fence or a boundary wall) may also be of interest for similar reasons (e.g., a suspect may attempt to flee with a stolen automobile through an open security gate). An automobile or a trailer may also be of interest, especially if the automobile or trailer has been reported stolen (or is in the process of being stolen).

Figure 4:
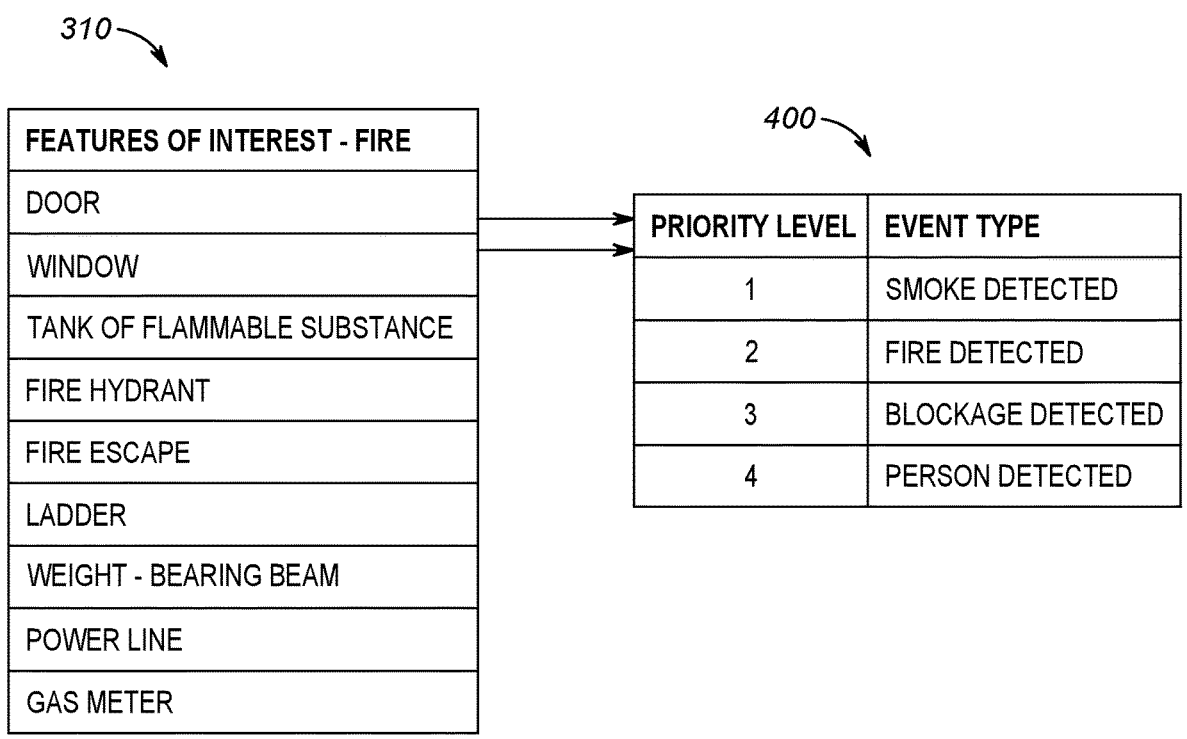
FIG. 4 provides an example list of event types that may be associated with some of the feature types (e.g., window and door) shown in FIG. 3, according to one example.

FIG. 4 provides an example list 400 of event types that may be associated with some of the feature types (e.g., window and door) found in the list 310, according to one example. The feature types and event types shown are merely illustrative; persons of ordinary skill in the art will recognize that other event types, feature types, and priority schemes not shown in FIG. 4 may be used without departing from the spirit and scope of this disclosure.

As shown in the list 400, some events that may occur at a door (or a window) during a fire incident the detection of smoke, fire, a person, or a blockage at the door (or the window). The list 400 also includes an example priority level for each event type. In this example, the higher the priority level, the greater the urgency of the event. Thus, in the list 400, the detection of a person at a door or a window has a higher priority level than any of the other event types shown. The detection of smoke at a door or window, by contrast, has a lower priority level than any of the other event types shown. The detection of fire has a higher priority level higher than that of the detection of smoke; the detection of a blockage has a higher priority level than that of the detection of fire.

As explained with respect to FIG. 1 and in other portions of this disclosure, the priority levels for the event types may be used to help determine which format to use for a push notification to notify an incident commander or other public-safety responders when events occur at features of interest.

Figure 5:
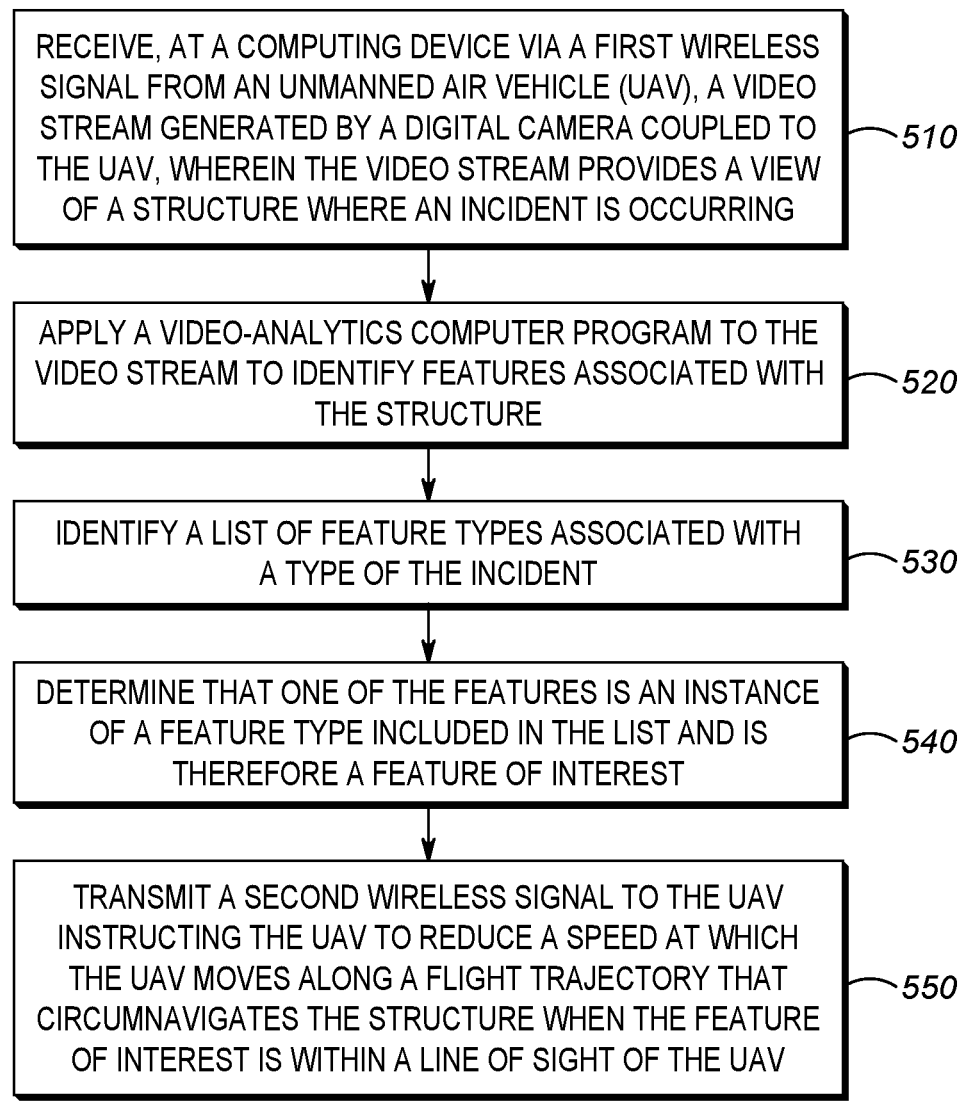
FIG. 5 illustrates functionality for systems disclosed herein, according to one illustrative and non-limiting example.

FIG. 5 illustrates functionality 500 for systems disclosed herein, according to one illustrative and non-limiting example. The functionality 500 does not have to be performed in the exact sequence shown. Also, various blocks may be performed in parallel rather than in sequence. Accordingly, the elements of the functionality 500 are referred to herein as "blocks" rather than "steps." The functionality 500 can be executed as instructions on a machine (e.g., by one or more processors), where the instructions are stored on a transitory or non-transitory computer-readable storage medium. While only five blocks are shown in the functionality 500, the functionality 500 may comprise other actions described herein. Also, in some examples, some of the blocks shown in the functionality 500 may be omitted without departing from the spirit and scope of this disclosure.

As shown in block 510, the functionality 500 includes receiving, at a computing device via a first wireless signal from an unmanned air vehicle (UAV), a video stream generated by a digital camera coupled to the UAV, wherein the video stream provides a view of a structure where an incident is occurring.

As shown in block 520, the functionality 500 includes applying a video-analytics computer program to the video stream to identify features associated with the structure.

As shown in block 530, the functionality 500 includes identifying a list of feature types associated with a type of the incident.

As shown in block 540, the functionality 500 includes determining that one of the features is an instance of a feature type included in the list and is therefore a feature of interest.

As shown in block 550, the functionality 500 includes transmitting a second wireless signal to the UAV instructing the UAV to reduce a speed at which the UAV moves along a flight trajectory that circumnavigates the structure when the feature of interest is within a line of sight of the UAV. The second wireless signal may further instruct the UAV to increase the speed at which the UAV moves along the flight trajectory when the feature of interest is not within the line of sight of the UAV. In addition, second wireless signal may further instruct the UAV to adjust an orientation of the digital camera when the feature of interest is within the line of sight of the UAV to maintain the feature of interest within a field of view (FOV) of the digital camera.

The functionality 500 may further include detecting, based on the video stream, that an event has commenced where the feature of interest is located on the structure; identifying an event type for the event; determining a priority level for the event based on the feature type and the event type; determining a format for a push notification based on the priority level; and sending the push notification to a mobile device to notify a user about the event.

The push notification may indicate the event type and the feature type. Furthermore, the push notification may comprise a still image extracted from the video stream. The still image may depict the feature of interest after commencement of the event. In addition or alternatively, the push notification may also comprise a video clip extracted from the video stream. The video clip may depict the feature of interest after commencement of the event. In addition or alternatively, the push notification may comprise a text message or an audio message that indicates the event type and the feature type.

The functionality 500 may further include, upon detecting that the priority level satisfies a condition, sending a third wireless signal to the UAV instructing the UAV to adjust an altitude of the flight trajectory so that the flight trajectory intersects with a line that is normal to a plane that is parallel to a face of the structure on which the feature of interest is located. The line passes through the feature of interest.

The functionality 500 may further include, upon determining that the priority level satisfies a condition, increasing a size of a first viewing area for the video stream on an electronic display that is communicatively connected to the computing device; and reducing a size of a second viewing area on the electronic display for a second video stream received at the computing device.

The functionality 500 may further include applying a photogrammetry program to a plurality of still images extracted from the video stream to generate a digital three-dimensional (3D) model of the structure; and rendering an image of the 3D model on an electronic display such that a region of the 3D model that depicts the feature of interest is highlighted in the image. Furthermore, the functionality 500 may include detecting, based on the video stream, that an event has commenced where the feature of interest is located on the structure; identifying an event type for the event; determining a priority level for the event based on the feature of interest and the event type; upon determining that the priority level satisfies a condition, rendering an updated image of the 3D model on the electronic display such that a face of the 3D model is aligned in parallel with a plane of the electronic display in the updated image, wherein the region of the 3D model that depicts the feature of interest is located on the face; and rendering a graphical indication of the event type on the electronic display in the region of the 3D model that depicts the feature of interest.

Figure 6:
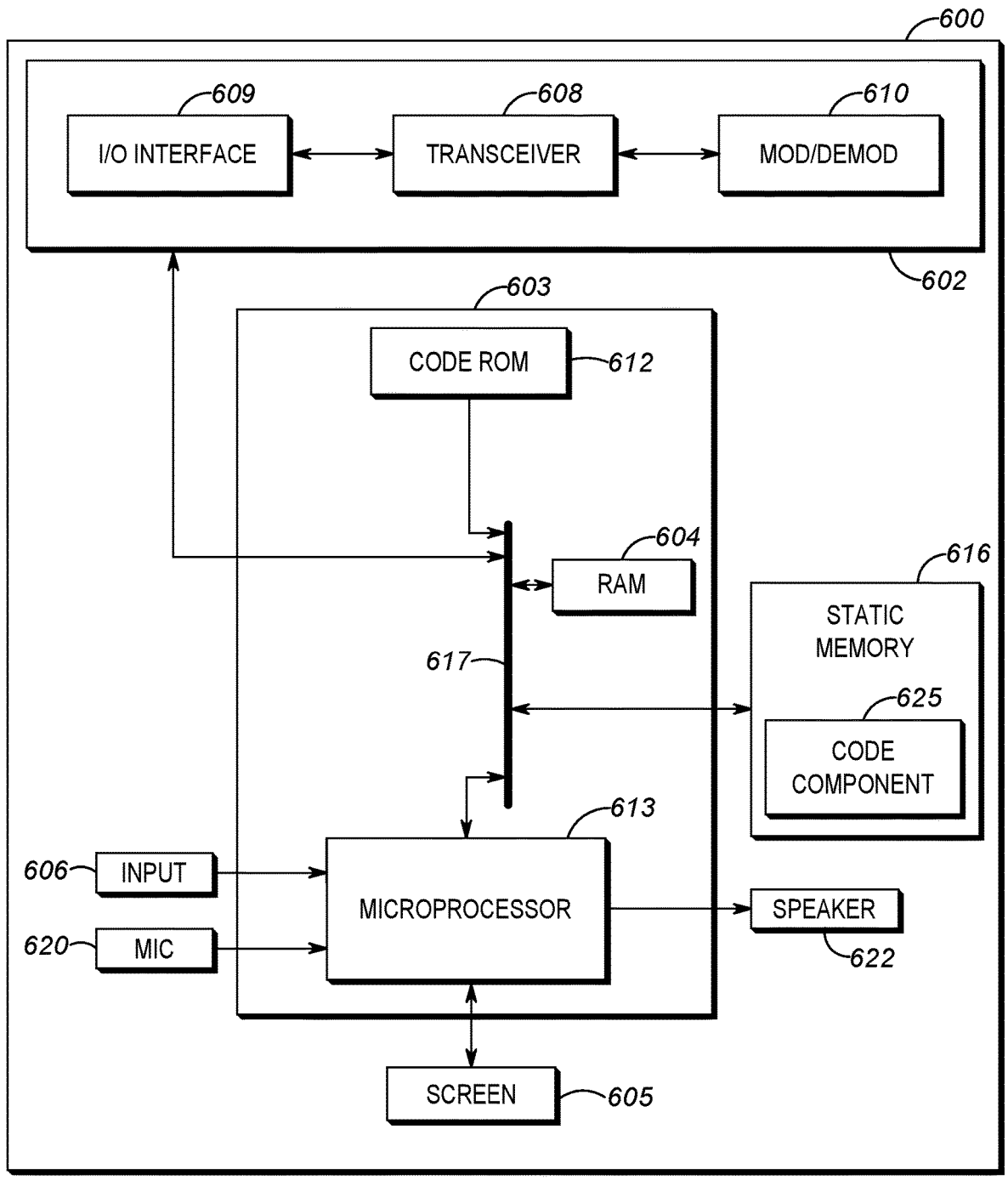
FIG. 6 is a schematic diagram that illustrates a computing device 600 according to some examples described in the present disclosure.

FIG. 6 is a schematic diagram that illustrates a computing device 600 according to some examples described in the present disclosure. The computing device 600 may be, for example, a laptop computer or a desktop computer located in the public-safety response vehicle 120 (e.g., as the computing device 121), circuitry embedded in one or more of the mobile devices 140, one or more of the servers 170, circuitry embedded in the UAV 130, or at some other location in the wireless communication network 150 or the data network 160. As shown in FIG. 6, the computing device 600 includes a communications unit 602 coupled to a common data and address bus 617 of a processing unit 603. In some examples, the computing device 600 may also include an input unit (e.g., keypad, pointing device, touch-sensitive surface, etc.) 606 and an electronic display 605, each coupled to be in communication with the processing unit 603.

A microphone 620 may be present for capturing audio at a same time as an image or video that is further encoded by processing unit 603 and transmitted as an audio/video stream data by the communication unit 602 to other devices. A speaker 622 may be present for reproducing audio that is sent to the computing device 600 via the communication unit 602, or may be used to play back alert tones or other types of pre-recorded audio (e.g., as part of a push notification).

The processing unit 603 may include a code Read-Only Memory (ROM) 612 coupled to the common data and address bus 617 for storing data for initializing system components. The processing unit 603 may further include a microprocessor 613 coupled, by the common data and address bus 617, to a Random Access Memory (RAM) 604 and a static memory 616.

The communications unit 602 may include one or more wired or wireless input/output (I/O) interfaces 609 that are configurable to communicate with other devices, such as a portable radio, tablet, wireless RAN, or vehicular transceiver.

The communications unit 602 may include one or more transceivers 608 that are wireless transceivers, such as a Digital Mobile Radio (DMR) transceiver, a P25 transceiver, a Bluetooth® transceiver, a Wi-Fi transceiver, an LTE transceiver, a WiMAX transceiver, a 5G transceiver, or another type of wireless transceiver configurable to communicate via a wireless radio network. The communications unit 602 may additionally or alternatively include one or more transceivers 608 that are wireline transceivers, such as an Ethernet transceiver, a Universal Serial Bus (USB) transceiver, or a similar transceiver configurable to communicate via a twisted pair wire, a coaxial cable, a fiber-optic link, or a similar physical connection to a wireline network. The transceiver 608 is also coupled to a combined modulator/demodulator 610.

The microprocessor 613 has ports for coupling to the input unit 606 and microphone 620, and to the electronic display 605 and speaker 622. Static memory 616 may store operating code 625 for the microprocessor 613 that, when executed, performs one or more of the blocks set forth in FIG. 5.

Static memory 616 may comprise, for example, a harddisk drive (HDD), an optical disk drive such as a compact disk (CD) drive or digital versatile disk (DVD) drive, a solid state drive (SSD), a flash memory drive, or some other type of drive.

EXAMPLES

The following additional examples are included below to highlight several aspects of the systems and processes described herein. However, the scope of the disclosure is not limited to these additional examples or the other examples described herein.

Example 1 includes a system comprising: one or more processors; and a memory containing instructions thereon which, when executed by the one or more processors, cause the processors to perform a set of actions comprising: receiving, at a computing device via a first wireless signal from an unmanned air vehicle (UAV), a video stream generated by a digital camera coupled to the UAV, wherein the video stream provides a view of a structure where an incident is occurring; applying a video-analytics computer program to the video stream to identify features associated with the structure; identifying a list of feature types associated with a type of the incident; determining that one of the features is an instance of a feature type included in the list and is therefore a feature of interest; and transmitting a second wireless signal to the UAV instructing the UAV to reduce a speed at which the UAV moves along a flight trajectory that circumnavigates the structure when the feature of interest is within a line of sight of the UAV.

Example 2 includes the system of example 1, wherein the second wireless signal further instructs the UAV to increase the speed at which the UAV moves along the flight trajectory when the feature of interest is not within the line of sight of the UAV.

Example 3 includes the system of example 1 or 2, wherein the second wireless signal further instructs the UAV to adjust an orientation of the digital camera when the feature of interest is within the line of sight of the UAV to maintain the feature of interest within a field of view (FOV) of the digital camera.

Example 4 includes the system of example 1, 2, or 3, wherein the set of actions further comprises: detecting, based on the video stream, that an event has commenced where the feature of interest is located on the structure; identifying an event type for the event; determining a priority level for the event based on the feature type and the event type; determining a format for a push notification based on the priority level; and sending the push notification to a mobile device to notify a user about the event.

Example 5 includes the system of example 4, wherein the push notification comprises one or more of: a still image extracted from the video stream, wherein the still image depicts the feature of interest after commencement of the event; a video clip extracted from the video stream, wherein the video clip depicts the feature of interest after commencement of the event; a text message indicating the event type or the feature type; or an audio message indicating the event type or the feature type.

Example 6 includes the system of example 4 or 5, wherein the set of actions further comprises: upon detecting that the priority level satisfies a condition, sending a third wireless signal to the UAV instructing the UAV to adjust an altitude of the flight trajectory so that the flight trajectory intersects with a line that is normal to a plane that is parallel to a face of the structure on which the feature of interest is located, wherein the line passes through the feature of interest.

Example 7 includes the system of example 4, 5, or 6, wherein the set of actions further comprises: upon determining that the priority level satisfies a condition, increasing a size of a first viewing area for the video stream on an electronic display that is communicatively connected to the computing device; and reducing a size of a second viewing area on the electronic display for a second video stream received at the computing device.

Example 8 includes the system of example 1, 2, 3, 4, 5, 6, or 7, wherein the set of actions further comprises: applying a photogrammetry program to a plurality of still images extracted from the video stream to generate a digital three-dimensional (3D) model of the structure; and rendering an image of the 3D model on an electronic display such that a region of the 3D model that depicts the feature of interest is highlighted in the image.

Example 9 includes the system of example 8, wherein the set of actions further comprises: detecting, based on the video stream, that an event has commenced where the feature of interest is located on the structure; identifying an event type for the event; determining a priority level for the event based on the feature of interest and the event type; upon determining that the priority level satisfies a condition, rendering an updated image of the 3D model on the electronic display such that a face of the 3D model is aligned in parallel with a plane of the electronic display in the updated image, wherein the region of the 3D model that depicts the feature of interest is located on the face; and rendering a graphical indication of the event type on the electronic display in the region of the 3D model that depicts the feature of interest.

Example 10 includes a method comprising: receiving, at a computing device via a first wireless signal from an unmanned air vehicle (UAV), a video stream generated by a digital camera coupled to the UAV, wherein the video stream provides a view of a structure where an incident is occurring; applying a video-analytics computer program to the video stream to identify features associated with the structure; identifying a list of feature types associated with a type of the incident; determining that one of the features is an instance of a feature type included in the list and is therefore a feature of interest; and transmitting a second wireless signal to the UAV instructing the UAV to reduce a speed at which the UAV moves along a flight trajectory that circumnavigates the structure when the feature of interest is within a line of sight of the UAV.

Example 11 includes the method of example 10, wherein the second wireless signal further instructs the UAV to increase the speed at which the UAV moves along the flight trajectory when the feature of interest is not within the line of sight of the UAV.

Example 12 includes the method of example 10 or 11, wherein the second wireless signal further instructs the UAV to adjust an orientation of the digital camera when the feature of interest is within the line of sight of the UAV to maintain the feature of interest within a field of view (FOV) of the digital camera.

Example 13 includes the method of example 10, 11, or 12, the method further comprising: detecting, based on the video stream, that an event has commenced where the feature of interest is located on the structure; identifying an event type for the event; determining a priority level for the event based on the feature type and the event type; determining a format for a push notification based on the priority level; and sending the push notification to a mobile device to notify a user about the event.

Example 14 includes the method of example 13, wherein the push notification comprises one or more of: a still image extracted from the video stream, wherein the still image depicts the feature of interest after commencement of the event; a video clip extracted from the video stream, wherein the video clip depicts the feature of interest after commencement of the event; a text message indicating the event type or the feature type; or an audio message indicating the event type or the feature type.

Example 15 includes the method of example 13 or 14, the method further comprising: upon detecting that the priority level satisfies a condition, sending a third wireless signal to the UAV instructing the UAV to adjust an altitude of the flight trajectory so that the flight trajectory intersects with a line that is normal to a plane that is parallel to a face of the structure on which the feature of interest is located, wherein the line passes through the feature of interest.

Example 16 includes the method of example 13, 14, or 15, the method further comprising: upon determining that the priority level satisfies a condition, increasing a size of a first viewing area for the video stream on an electronic display that is communicatively connected to the computing device; and reducing a size of a second viewing area on the electronic display for a second video stream received at the computing device.

Example 17 includes the method of claim 10, 11, 12, 13, 14, 15, or 16, the method further comprising: applying a photogrammetry program to a plurality of still images extracted from the video stream to generate a digital three-dimensional (3D) model of the structure; and rendering an image of the 3D model on an electronic display such that a region of the 3D model that depicts the feature of interest is highlighted in the image.

Example 18 includes the method of example 17, the method further comprising: detecting, based on the video stream, that an event has commenced where the feature of interest is located on the structure; identifying an event type for the event; determining a priority level for the event based on the feature of interest and the event type; upon determining that the priority level satisfies a condition, rendering an updated image of the 3D model on the electronic display such that a face of the 3D model is aligned in parallel with a plane of the electronic display in the updated image, wherein the region of the 3D model that depicts the feature of interest is located on the face; and rendering a graphical indication of the event type on the electronic display in the region of the 3D model that depicts the feature of interest.

Example 19 includes a non-transitory computer-readable storage medium containing instructions that, when executed by one or more processors, perform a set of actions comprising: receiving, at a computing device via a first wireless signal from an unmanned air vehicle (UAV), a video stream generated by a digital camera coupled to the UAV, wherein the video stream provides a view of a structure where an incident is occurring; applying a video-analytics computer program to the video stream to identify features associated with the structure; identifying a list of feature types associated with a type of the incident; determining that one of the features is an instance of a feature type included in the list and is therefore a feature of interest; and transmitting a second wireless signal to the UAV instructing the UAV to reduce a speed at which the UAV moves along a flight trajectory that circumnavigates the structure when the feature of interest is within a line of sight of the UAV.

Example 20 includes the non-transitory computer-readable storage medium of example 19, wherein the second wireless signal further instructs the UAV to increase the speed at which the UAV moves along the flight trajectory when the feature of interest is not within the line of sight of the UAV.

Example 21 includes the non-transitory computer-readable storage medium of example 19 or 20, wherein the second wireless signal further instructs the UAV to adjust an orientation of the digital camera when the feature of interest is within the line of sight of the UAV to maintain the feature of interest within a field of view (FOV) of the digital camera.

Example 22 includes the non-transitory computer-readable storage medium of example 19, 20, or 21, wherein the set of actions further comprises: detecting, based on the video stream, that an event has commenced where the feature of interest is located on the structure; identifying an event type for the event; determining a priority level for the event based on the feature type and the event type; determining a format for a push notification based on the priority level; and sending the push notification to a mobile device to notify a user about the event.

Example 23 includes the non-transitory computer-readable storage medium of example 22, wherein the push notification comprises one or more of: a still image extracted from the video stream, wherein the still image depicts the feature of interest after commencement of the event; a video clip extracted from the video stream, wherein the video clip depicts the feature of interest after commencement of the event; a text message indicating the event type or the feature type; or an audio message indicating the event type or the feature type.

Example 24 includes the non-transitory computer-readable storage medium of example 22 or 23, wherein the set of actions further comprises: upon detecting that the priority level satisfies a condition, sending a third wireless signal to the UAV instructing the UAV to adjust an altitude of the flight trajectory so that the flight trajectory intersects with a line that is normal to a plane that is parallel to a face of the structure on which the feature of interest is located, wherein the line passes through the feature of interest.

Example 25 includes the non-transitory computer-readable storage medium of example 22, 23, or 24, wherein the set of actions further comprises: upon determining that the priority level satisfies a condition, increasing a size of a first viewing area for the video stream on an electronic display that is communicatively connected to the computing device; and reducing a size of a second viewing area on the electronic display for a second video stream received at the computing device.

Example 26 includes the non-transitory computer-readable storage medium of example 19, 20, 21, 22, 23, 24, or 25, wherein the set of actions further comprises: applying a photogrammetry program to a plurality of still images extracted from the video stream to generate a digital three-dimensional (3D) model of the structure; and rendering an image of the 3D model on an electronic display such that a region of the 3D model that depicts the feature of interest is highlighted in the image.

Example 27 includes the non-transitory computer-readable storage medium of example 26, wherein the set of actions further comprises: detecting, based on the video stream, that an event has commenced where the feature of interest is located on the structure; identifying an event type for the event; determining a priority level for the event based on the feature of interest and the event type; upon determining that the priority level satisfies a condition, rendering an updated image of the 3D model on the electronic display such that a face of the 3D model is aligned in parallel with a plane of the electronic display in the updated image, wherein the region of the 3D model that depicts the feature of interest is located on the face; and rendering a graphical indication of the event type on the electronic display in the region of the 3D model that depicts the feature of interest.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for increasing a line of sight period of time for imaging structural features of interest associated with a type of incident occurring at a structure, the system comprising:
    one or more processors; and
    a memory containing instructions thereon which, when executed by the one or more processors, cause the processors to perform a set of actions comprising:
        receiving, at a computing device via a first signal from an unmanned air vehicle (UAV), a video stream generated by a digital camera coupled to the UAV, wherein the video stream provides a view of a structure where an incident is occurring;
        applying a video-analytics computer program to the video stream to identify structural features associated with the structure;
        identifying a list of structure feature types of interest associated with a type of the incident occurring at the structure;
        determining that one of the identified structural features is an instance of a structure feature type of interest included in the list and is therefore a structural feature of interest; and
        transmitting a second signal to the UAV instructing the UAV to reduce a speed at which the UAV moves along a flight trajectory that circumnavigates the structure when the structural feature of interest is within a line of sight of the UAV relative to when the structural feature of interest is not within a line of sight of the UAV to increase an imaging time of the structural feature of interest.

2. The system of claim 1, wherein the second signal further instructs the UAV to increase the speed at which the UAV moves along the flight trajectory when the structural feature of interest is not within the line of sight of the UAV.

3. The system of claim 1, wherein the second signal further instructs the UAV to adjust an orientation of the digital camera when the structural feature of interest is within the line of sight of the UAV to maintain the structural feature of interest within a field of view (FOV) of the digital camera.

4. The system of claim 1, wherein the set of actions further comprises:
    detecting, based on the video stream, that an event has commenced where the structural feature of interest is located on the structure;
    identifying an event type for the event;
    determining a priority level for the event based on the feature type of interest and the event type;
    determining a format for a push notification based on the priority level; and
        sending the push notification to a mobile device via a wireless communication network to notify a user about the event.

5. The system of claim 4, wherein the push notification comprises one or more of:
    a still image extracted from the video stream, wherein the still image depicts the structural feature of interest after commencement of the event;
    a video clip extracted from the video stream, wherein the video clip depicts the structural feature of interest after commencement of the event;
    a text message indicating the event type or the feature type of interest; or
    an audio message indicating the event type or the feature type of interest.

6. The system of claim 4, wherein the set of actions further comprises:
    upon detecting that the priority level satisfies a condition, sending a third signal to the UAV instructing the UAV to adjust an altitude of the flight trajectory so that the flight trajectory intersects with a line that is normal to a plane that is parallel to a face of the structure on which the structural feature of interest is located, wherein the line passes through the structural feature of interest.

7. The system of claim 4, wherein the set of actions further comprises:
    upon determining that the priority level satisfies a condition, increasing a size of a first viewing area for the video stream on an electronic display that is communicatively connected to the computing device; and reducing a size of a second viewing area on the electronic display for a second video stream received at the computing device.

8. The system of claim 1, wherein the set of actions further comprises:
applying a photogrammetry program to a plurality of still images extracted from the video stream to generate a digital three-dimensional (3D) model of the structure; and
rendering an image of the 3D model on an electronic display such that a region of the 3D model that depicts the structural feature of interest is highlighted in the image.

9. The system of claim 8, wherein the set of actions further comprises:
detecting, based on the video stream, that an event has commenced where the structural feature of interest is located on the structure;
identifying an event type for the event;
determining a priority level for the event based on the structural feature of interest and the event type;
upon determining that the priority level satisfies a condition, rendering an updated image of the 3D model on the electronic display such that a face of the 3D model is aligned in parallel with a plane of the electronic display in the updated image, wherein the region of the 3D model that depicts the structural feature of interest is located on the face; and
rendering a graphical indication of the event type on the electronic display in the region of the 3D model that depicts the structural feature of interest.

10. A method for increasing a line of sight period of time for imaging structural features of interest associated with a type of incident occurring at a structure, the method comprising:
receiving, at a computing device via a first signal from an unmanned air vehicle (UAV), a video stream generated by a digital camera coupled to the UAV, wherein the video stream provides a view of a structure where an incident is occurring;
applying a video-analytics computer program to the video stream to identify structural features associated with the structure;
identifying a list of structure feature types of interest associated with a type of the incident occurring at the structure;
determining that one of the identified structural features is an instance of a structure feature type of interest included in the list and is therefore a structural feature of interest; and
transmitting a second signal to the UAV instructing the UAV to reduce a speed at which the UAV moves along a flight trajectory that circumnavigates the structure when the structural feature of interest is within a line of sight of the UAV relative to when the structure feature of interest is not within a line of sight of the UAV to increase an imaging time of the structural feature of interest.

11. The method of claim 10, wherein the second signal further instructs the UAV to increase the speed at which the UAV moves along the flight trajectory when the structural feature of interest is not within the line of sight of the UAV.

12. The method of claim 10, wherein the second signal further instructs the UAV to adjust an orientation of the digital camera when the feature of interest is within the line of sight of the UAV to maintain the structural feature of interest within a field of view (FOV) of the digital camera.

13. The method of claim 10, further comprising:
detecting, based on the video stream, that an event has commenced where the structural feature of interest is located on the structure;
identifying an event type for the event;
determining a priority level for the event based on the feature type of interest and the event type;
determining a format for a push notification based on the priority level; and
sending the push notification to a mobile device via a wireless communication network to notify a user about the event.

14. The method of claim 13, wherein the push notification comprises one or more of:
a still image extracted from the video stream, wherein the still image depicts the structural feature of interest after commencement of the event;
a video clip extracted from the video stream, wherein the video clip depicts the structural feature of interest after commencement of the event;
a text message indicating the event type or the feature type of interest; or
an audio message indicating the event type or the feature type of interest.

15. The method of claim 13, further comprising:
upon detecting that the priority level satisfies a condition, sending a third signal to the UAV instructing the UAV to adjust an altitude of the flight trajectory so that the flight trajectory intersects with a line that is normal to a plane that is parallel to a face of the structure on which the structural feature of interest is located, wherein the line passes through the structural feature of interest.

16. The method of claim 13, further comprising:
upon determining that the priority level satisfies a condition, increasing a size of a first viewing area for the video stream on an electronic display that is communicatively connected to the computing device; and
reducing a size of a second viewing area on the electronic display for a second video stream received at the computing device.

17. The method of claim 10, further comprising:
applying a photogrammetry program to a plurality of still images extracted from the video stream to generate a digital three-dimensional (3D) model of the structure; and
rendering an image of the 3D model on an electronic display such that a region of the 3D model that depicts the structural feature of interest is highlighted in the image.

18. The method of claim 17, further comprising:
detecting, based on the video stream, that an event has commenced where the structural feature of interest is located on the structure;
identifying an event type for the event;
determining a priority level for the event based on the structural feature of interest and the event type;
upon determining that the priority level satisfies a condition, rendering an updated image of the 3D model on the electronic display such that a face of the 3D model is aligned in parallel with a plane of the electronic display in the updated image, wherein the region of the 3D model that depicts the structural feature of interest is located on the face; and
rendering a graphical indication of the event type on the electronic display in the region of the 3D model that depicts the structural feature of interest.

19. A non-transitory computer-readable storage medium containing instructions that, when executed by one or more processors, perform a set of actions for increasing a line of sight period of time for imaging structural features of interest associated with a type of incident occurring at a structure, the set of actions comprising:
- receiving, at a computing device via a first signal from an unmanned air vehicle (UAV), a video stream generated by a digital camera coupled to the UAV, wherein the video stream provides a view of a structure where an incident is occurring;
- applying a video-analytics computer program to the video stream to identify structural features associated with the structure;
- identifying a list of structure feature types of interest associated with a type of the incident occurring at the structure;
- determining that one of the identified structural features is an instance of a structure feature type of interest included in the list and is therefore a structural feature of interest; and
- transmitting a second signal to the UAV instructing the UAV to reduce a speed at which the UAV moves along a flight trajectory that circumnavigates the structure when the structural feature of interest is within a line of sight of the UAV relative to when the structure feature of interest is not within a line of sight of the UAV to increase an imaging time of the structural feature of interest.

20. The non-transitory computer-readable storage medium of claim 19, wherein the set of actions further comprises:
- detecting, based on the video stream, that an event has commenced where the structural feature of interest is located on the structure;
- identifying an event type for the event;
- determining a priority level for the event based on the feature type of interest and the event type;
- determining a format for a push notification based on the priority level; and
  - sending the push notification to a mobile device via a wireless communication network to notify a user about the event.

\* \* \* \* \*